United States Patent [19]

Stewart et al.

[11] Patent Number: 5,568,622
[45] Date of Patent: Oct. 22, 1996

[54] METHOD AND APPARATUS FOR MINIMIZING THE NUMBER OF CONTROL WORDS IN A BROM CONTROL STORE OF A MICROPROGRAMMED CENTRAL PROCESSOR

[75] Inventors: Wilbur Stewart, Phoenix; Richard L. Demers, Peoria; Ronald E. Lange, Glendale, all of Ariz.

[73] Assignee: Bull HN Information Systems Inc., Billerica, Mass.

[21] Appl. No.: 48,323

[22] Filed: Apr. 15, 1993

[51] Int. Cl.⁶ ................................................. G06F 9/22
[52] U.S. Cl. .................. 395/375; 364/231.8; 364/958.3; 364/DIG. 1; 364/DIG. 2
[58] Field of Search .................. 395/375; 364/231.8, 364/958.3, 961.1, 251.4'

[56] References Cited

U.S. PATENT DOCUMENTS

| | | | |
|---|---|---|---|
| 3,651,475 | 3/1972 | Dunbar et al. | 364/236.2 |
| 3,958,227 | 5/1976 | Evans | 340/172.5 |
| 4,031,515 | 7/1977 | Kashio | 340/347 |
| 4,357,678 | 11/1982 | Davis | 364/900 |
| 4,485,468 | 4/1982 | Slana | 370/58 |
| 4,489,395 | 12/1984 | Sato | 395/425 |

*Primary Examiner*—William M. Treat
*Assistant Examiner*—Zarni Maung
*Attorney, Agent, or Firm*—J. S. Solakian; J. H. Phillips

[57] ABSTRACT

Method and apparatus to reduce the number of control words stored in a read only control store of a microprogrammed unit of the CPU of a large scale computer. A set of control fields are required to control the active elements of the unit to cause the unit to execute a large number of different basic operations. Typically the required set of control fields are included in control words stored in a control store controlling the unit during the execution of a basic operation. Obtaining some of the set of required control fields from other sources available within the unit results in a significant reduction in the number of control words stored in the control store without reducing the functionality of the unit.

12 Claims, 3 Drawing Sheets

METHOD AND APPARATUS FOR MINIMIZING THE NUMBER OF CONTROL WORDS IN A BROM CONTROL STORE OF A MICROPROGRAMMED CENTRAL PROCESSOR

BACKGROUND OF THE INVENTION

(1) Field of the Invention

This invention is in the field of microprogrammed central processors, and more particularly relates to improvements which reduce the number of control words stored in the basic operations control store needed to execute required basic operations in a unit of a large scale pipelined central processor that is implemented on a single very large scale integrated circuit (VLSI) chip.

(2) Description of Related Art

Microprogrammed central processing units (CPU)s are well known. They typically include one or more read only control stores, or ROMs, in which are stored control words. Each control word includes a plurality of control fields, with the bits of each control field being the control signals that cause the circuits of a CPU to execute an instruction.

Depending on the complexity of the central processor, the number of bits in a control word can be quite large, exceeding 100 in some cases. In large scale computer systems it is a common requirement that the system be upward compatible, which means that it be able to execute any application program that was written to run on any predecessor system without the necessity to modify or rewrite such earlier application programs. This results in a requirement that the CPUs of the latest version of the system be able to execute a large number of instructions approaching one thousand in at least one example.

The instruction to be executed is written into an instruction register of the CPU and the operation code, or op. code, control field of the instruction is typically the address in a read only control store of a control word that will cause the CPU to execute the instruction. Implementation of such a CPU when pipelined complicates the circuits of the CPU since not all the fields of a given control word required to execute a given instruction may be used during one time slot, but rather over several time slots.

With the advent of VLSI chips, it is common practice to place all of the circuit elements including control store ROMs of a significant portion of a CPU of a large scale computer system such as an address and execution (AX) unit, a floating point (FP) unit, or a decimal numeric (DN) unit, for example, on a single VLSI chip. Notwithstanding the large number of circuit elements that can be placed on a single VLSI chip, the space available is limited and this limitation applies to control stores which in turn limits the size of the control stores.

SUMMARY OF THE INVENTION

The present invention provides a method and apparatus for reducing the number of basic operations (BOPS) control words which are used to control basic operations of the AX unit of a CPU stored in a basic operations read only control store (BROM). The number of BOPS control words required to be stored in a BROM can be significantly reduced, or the BROM can be vertically compressed, by reducing the functionality of selected BOPS control words (BOPSCW)s while retaining the functionality of the AX unit as if there were no reduction in the number of BOPSCWs by obtaining, or deriving, control fields eliminated from BOPSCWs from other sources, or resources, of the AX unit.

The AX unit of the CPU includes an instruction register into which the instruction to be executed is written, a main read only (MROM) control store in which are stored microsequencer control words (MSCW)s which, when written into a MSCW register, control the operations of the components of the CPU to execute the instruction in the instruction register. Some of the operations of the AX unit include such functions as effective and virtual address formation, memory access control, security checks as well as the execution of basic instructions, or basic operations. To execute a basic operation, the MSCW in the MSCW register includes a control field which is the address of a BOPSCW stored in a basic operations read only control store, BROM. Upon the receipt from the MSCW register of the BROM address field, the BROM reads out the BOPSCW stored at the addressed location and the BOPSCW is written into the BOPSCW register.

Basic operations that are the preferred subject of this invention involve the arithmetic and logic unit (ALU) of the AX unit and an addressable register file that contains several addressable registers. Each addressable register of the register file in response to a write address control field being applied to the register file will have written into it an operand applied to the register file during the same time slot, and each such register in response to a read address control field being applied to the register file will read out an operand previously written into it and apply the operand read out of the addressed register as the A or B operand to the ALU. The ALU will perform in response to a functional control field, (Func.) being applied to it one, of a plurality of different arithmetic and logical operations on the A and B input operands applied to the ALU during the time slot, (TS), Func. is applied to the ALU. As a result, the ALU produces a result operand C which is written into one of the addressable registers of the register file to complete a basic operation during the next TS.

The read addresses of the addressable registers into which have been written the A and B operands to be applied to the ALU are each specified by a read address control field, RdA, and RdB; the arithmetic or logical function to be performed by the ALU is defined by Func.; and the address of the addressable register of the register file into which the result C operand is to be written is specified by write address control field, WtC. If the number of addressable registers in the register file is 8, or $2^3$, and the number of functions performed by the ALU is also 8, and if the two read address control fields, the one write address control field and the function control field are included in BOPSCWs stored in the BROM, then the BROM would require $2^{12}$, or 4096, control words to execute all the possible combinations of these control fields. To reduce the number of BOPSCWs stored in the BROM, this invention teaches removing one or more of the control fields from the BOPSCWs such as WtC and Func. Removing two control fields from the BOPSCWs using the assumptions stated above would reduce the maximum number of BOPSCWs stored in the BROM to $2^6$, or 64. However, to maintain the functionality to execute all basic operations involving the addressable registers of the register file and the ALU, it is necessary to obtain, or to derive, from other sources, or resources, of the unit the control fields removed from the BOPSCWs. Removing control fields from the BOPSCWs and obtaining such control fields from other resources of the unit results in a significant reduction in the size of the BROM while maintaining the same functionality. If, for example, the write address control field, WtC, and the functional control field, Func., are removed from the BOPSCWs and are added to the MSCWs stored in the MROM, for example, the price is an increase in the number of bits in each MSCW by six using the above assumptions for the number of bits in WtC and Func. which is compensated to an extent by a reduction in the number of bits included in the BROM address field of each MSCW.

Another source for Func. is the op. code control field of the instruction in the instruction register. Deriving Func. in this manner has the advantage of reducing the number of bits that are added to each MSCW to accommodate Func. while achieving the same functionality.

It is therefore an object of this invention to minimize the number of control words stored in a read only control store of a microprogrammed unit of a CPU by removing one or more control fields from each such control word stored in the control store while making such control fields available from other sources of the unit so as not to reduce the functionality of the unit.

It is another object of this invention to vertically compress the size of a read only control store of a microprogrammed unit of a CPU by eliminating one or more control fields from each control word of the control store while retaining the same functionality of the unit by deriving the eliminated control fields from other resources of the CPU.

BRIEF DESCRIPTION OF THE DRAWINGS

Other objects, features and advantages of the invention will be readily apparent from the following description of a preferred embodiment thereof, taken in conjunction with the accompanying drawings, although variations and modifications may be affected without departing from the spirit and scope of the novel concepts of the disclosure, and in which.

DESCRIPTION OF THE PREFERRED EMBODIMENTS

Figure 1:
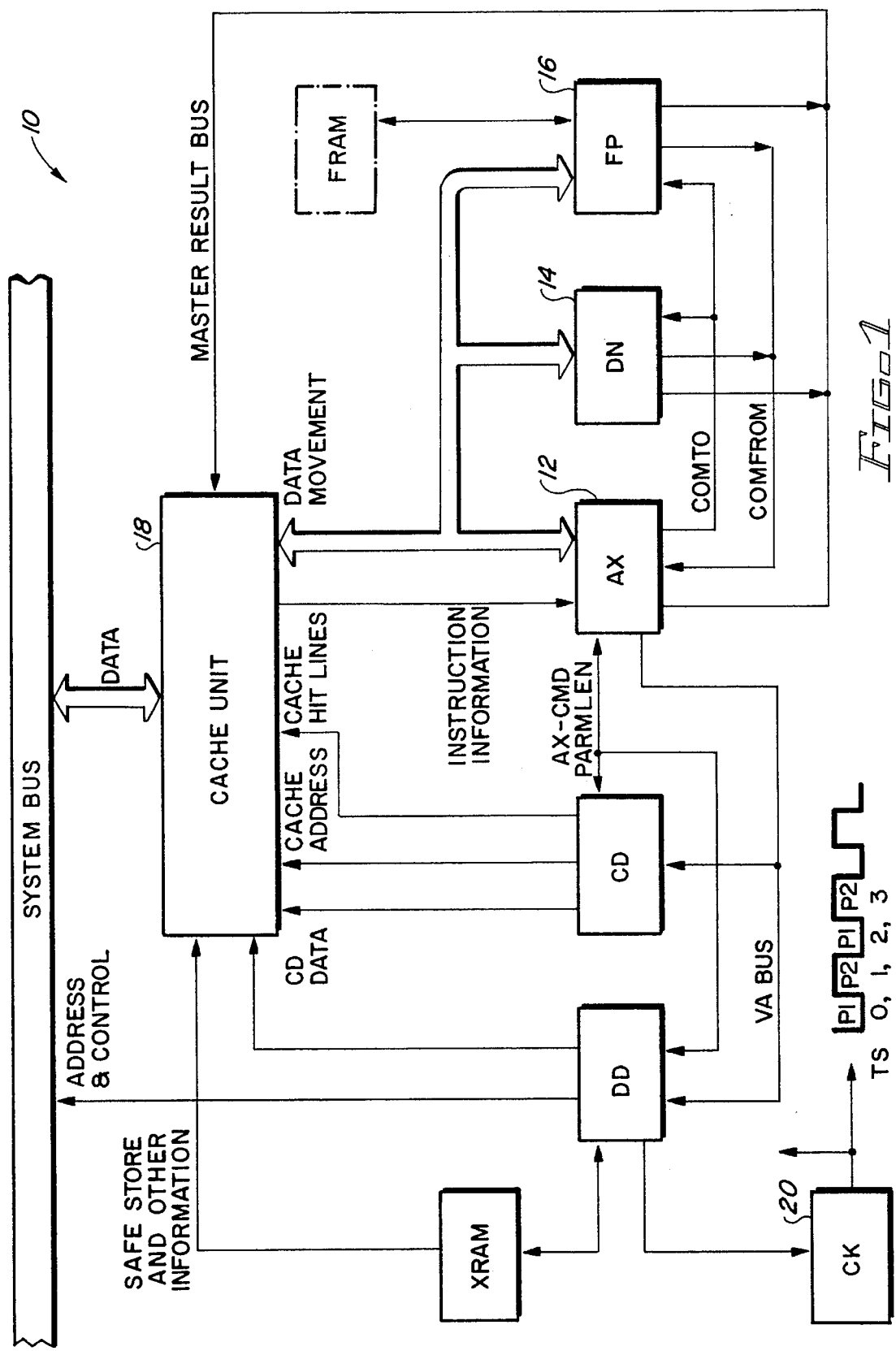
FIG. 1 is a block diagram of a central processing unit in which the subject invention is employed.

Referring to FIG. 1, CPU 10 includes as major subsystems address and execution (AX) unit 12, decimal numeric (DN) unit 14, floating point (FP) unit 16, and cache unit 18. Other components of CPU 10 illustrated in FIG. 1 and the AX unit 12, DN unit 14, FP unit 16, and cache unit 18 which are interconnected by buses over which the components of CPU 10 communicate. The main functions performed by the AX unit include: effective and virtual address formation; memory access control; security checks; register change or use control, and the execution of basic operations.

The functions performed by DN unit 14 include the execution of decimal numeric instructions and decimal-to-binary and binary-to-decimal conversion instructions. The FP unit 16 executes all floating point arithmetic instructions. The principal function of cache unit 18 is the storage of instructions and operands. Clock distribution circuit 20 produces and distributes to the components of CPU 10 a two phase clock signal with each phase of the clock signal defining, or determining, a time slot, TS.

Figure 2:
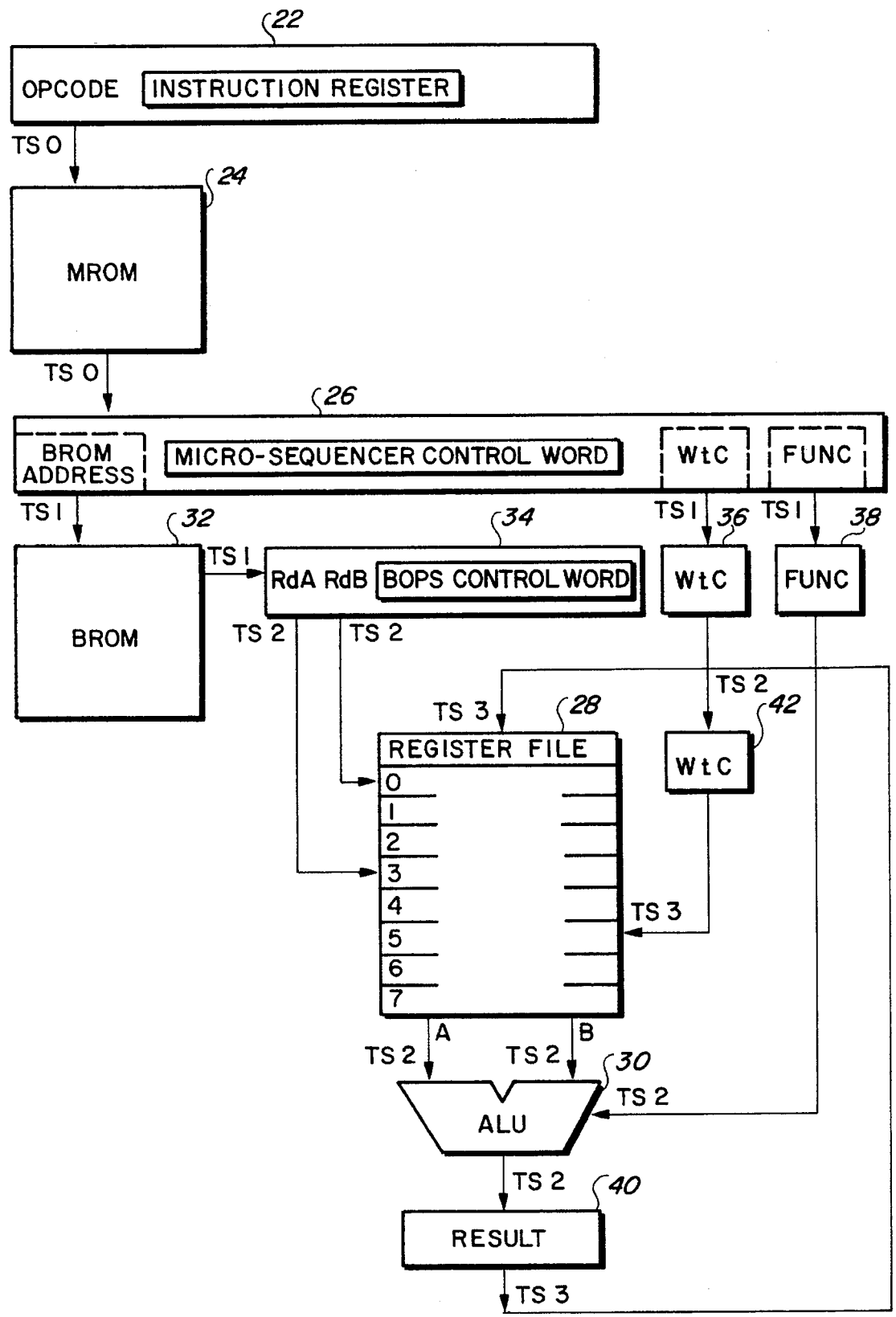
FIG. 2 is a block diagram of one embodiment of the invention.

The embodiment of the invention illustrated in FIG. 2 is an integral part of AX unit 12. However, only the circuit elements of AX unit 12 required to describe the invention and how it functions are illustrated. Instruction register 22 will have an instruction written into it and latched at the end of a time slot prior to the first of a set of four time slots TS 0–3 required to execute a basic operation. The instruction in instruction register 22 includes an operation, or op., code control field. During TS 0 of the set of four time slots required to execute a basic operation specified by the op. code field of the instruction in instruction register 22, an address field consisting of the op. code field of the instruction, or derived from it, is applied to MROM 24 which causes MROM 24 to read out the MSCW stored in the addressed location of MROM 24. The MSCW read out of MROM 24 is written into MSCW register 26 and latched therein at the end of TS 0.

The MSCW written into MSCW register 26 in the embodiment illustrated in FIG. 2 includes a BROM address control field, the write address control field, WtC, and the function control field, Func. During TS 1, the BROM address control field of the MSCW in MSCW register 26 is read out of register 26 and applied to BROM 32. In response thereto, BROM 32 reads out the BOPSCW stored in the addressed location and applies that BOPSCW to BOPSCW register 34 into which it is written and latched at the end of TS 1. Since all the control fields of the MSCW written into MSCW register 26 are read out of register 26 during TS 1, control fields WtC and Func. are written into staging registers 36 and 38 at the end of TS 1.

The BOPSCW written into BOPSCW register 34 in TS 1 includes a RdA and a RdB control field. The RdA control field identifies, or addresses, one of the addressable registers of register file 28 where the operand which is to be the A input operand to ALU 30 has been written and which is applied to ALU 30. The RdB control field identifies the addressable register of register file 28 where the operand which is to be the B input operand to ALU 30 has been written and which is applied to ALU 30.

During TS 2, while the basic operation is in execution, the RdA and RdB control fields written into register 34 at the end of TS 1 are applied to register file 28 which causes the A and B operands in the addressed registers of register file 28 to be applied to ALU 30 as its A and B input operands. The function control field, Func., written into staging register 38 during TS 1 is read out of register 38 and applied to ALU 30. The bits of the Func. applied to ALU 30 cause ALU 30 to execute the arithmetic or logic function on the A and B operands specified by Func. to produce the result operand C. Operand C is applied to and written into result register 40 and latched in result register 40 by the end of TS 2. The control field WtC written into staging register 36 during TS 1 is written into staging register 42 and latched therein at the end of TS 2.

During TS 3, operand C is read out of register 40 and applied to register file 28, and WtC is read out of staging register 42 and applied to register file 28 causing operand C to be written into the addressable register identified by WtC to complete the operation specified by the op. code control field of the instruction written into instruction register 22 prior to TS 0.

Figure 3:
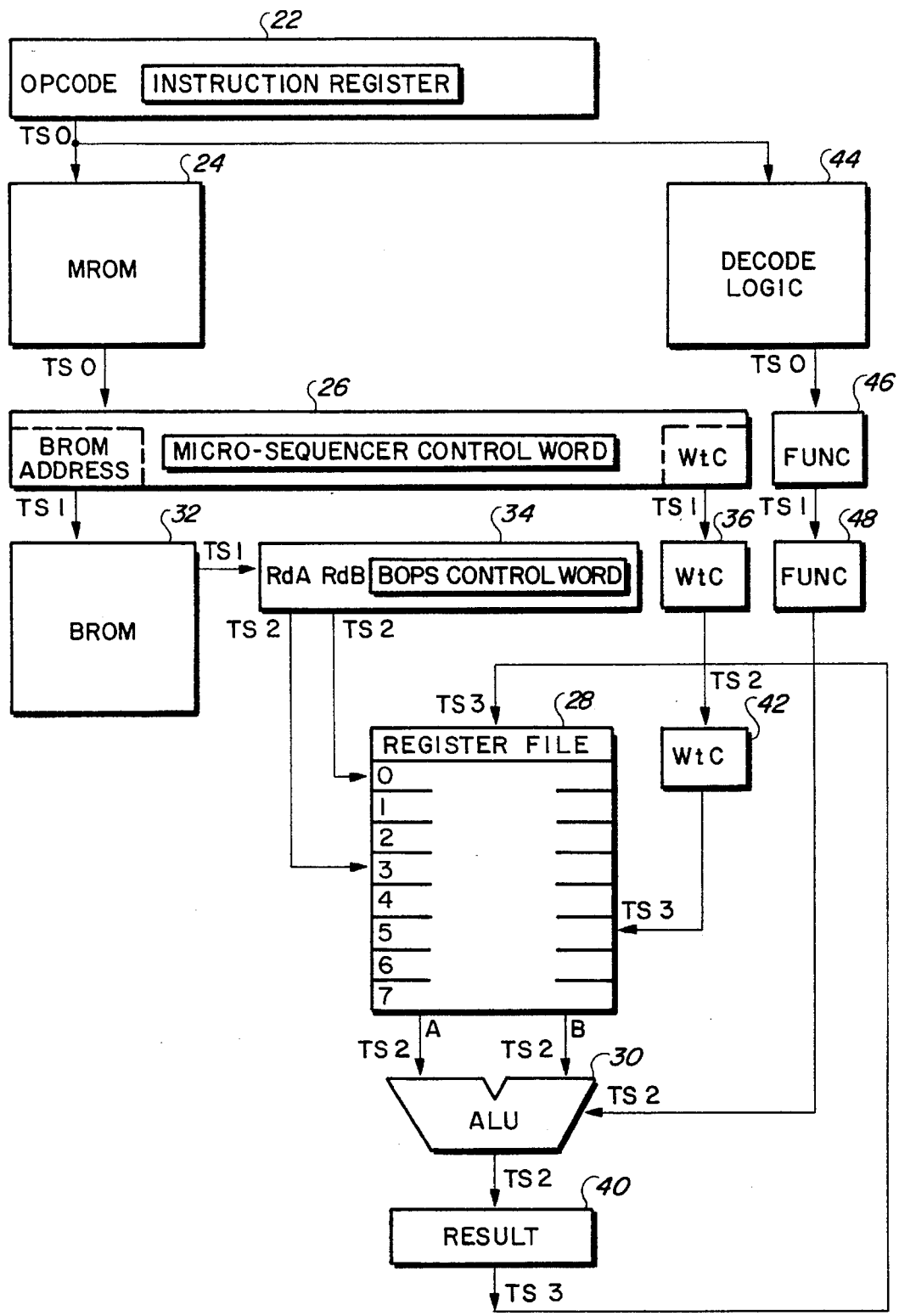
FIG. 3 is a block diagram of a second embodiment of the invention.

In the embodiment illustrated in FIG. 3, the structure and function of the circuit elements illustrated are substantially the same as those of the embodiment illustrated in FIG. 2 with the exception that the functional control field, Func., is derived, or obtained, from the op. code control field of the instruction in instruction register 22 which contains information identifying the particular arithmetic or logic function ALU 30 is to perform in executing the basic operation. Thus, during time slot 0 the op. code field of the instruction stored in instruction register 22 is applied to decode logic block 44, which could also be implemented as a ROM, which in response thereto produces Func. Func. is applied to staging register 46 where it is latched at the end of TS 0. During TS 1, Func. is read out of staging register 46 and written into staging register 48 and latched therein at the end of TS 1. During TS 2, Func. is read out of register 48 and applied to ALU 30 where it determines the arithmetic or logic function executed by ALU 30 during TS 2 on the A and B operands applied to it from register file 28 during TS 2.

The main difference between the embodiments illustrated in FIG. 2 and FIG. 3 is that in the embodiment of FIG. 3 the functional control field, Func., is derived by decoding the op. code field of the instruction in instruction register 22 rather by adding it to the MSCWs stored in BROM 32. In the embodiment of FIG. 3, since Func. is not included in the MSCW control words stored in MROM 24, the number of bits in the MSCWs is reduced by the number of bits comprising Func.

In the preferred embodiments, the number of addressable registers in register file 28 is eight. Thus, to identify, or address one of the 8 registers in register file 28 requires that the RdA, RdB, and WtC address control fields each contain at least three bits. While in describing supra the number of arithmetic and logic functions that ALU 30 can perform on the A and B operands applied to ALU 30 during TS 2 of the four time slots required to execute a basic operation in which ALU 30 and register file 28 are the active circuit elements, it was assumed that ALU 30 had eight such functions. In fact, in the preferred embodiment, ALU 30 has a repertoire of thirty two functions. As a result, function control field, Func., requires at least five bits to specify the function to be performed by ALU 30. From the foregoing it follows that the reduction in the number of basic operations control words, BOPSCWs, stored in BROM 32 as the result of removing two control field from each BOPSCW, the address control field WtC and the functional control field Func. in the embodiments illustrated in FIGS. 2 and 3, is a large fraction of the theoretical maximum number required if all four of these control fields were included in each BOPSCW. Fortunately, not all of the possible combinations of the control fields RdA, RdB, WtC and Func. are required to execute the instructions of all the application programs that CPU 10 is required execute. Thus, in a preferred embodiment of AX unit 12 of CPU 10, the actual reduction in the number of BOPS control words stored in BROM is reduced by substantially one half as the result of practicing the invention by obtaining two of the required control fields required to execute a basic operation from resources of AX unit 12 other than BOPSCWs such as a MSCW written into MSCW register 26 or the op. code control field of an instruction written into instruction register 22 as described with respect to the embodiments illustrated in FIG. 2 and FIG. 3.

From the foregoing it should be evident that various modifications can be made to the described embodiments without departing from the scope of the present invention.

What is claimed is:

1. In a pipelined central processing unit (CPU), the method of reducing the number of basic operations (BOPS) control words (BOPSCW)s stored in a basic operations read only control store (BROM) for controlling basic operations of an execution unit of said CPU, said execution unit including an instruction register into which an instruction to be executed by the execution unit is written, said instruction including an operation (op.) code field; a main read only control store (MROM) for storing micro-sequence control words (MSCW)s for controlling the operation of the execution unit, said MSCWs including a plurality of control fields, one of said control fields being an address control field containing an address of a BOPSCW in the BROM, an MSCW register into which a MSCW read out of the MROM is written, a BOPSCW register into which a BOPSCW read out of the BROM is written; an instruction written into the instruction register, an MSCW written into the MSCW register, and a BOPSCW written into the BOPSCW register each being a potential source of a control field required to execute a basic operation; a register file including a plurality of addressable registers, each of said addressable registers having an address and into which an operand can be written under the control of a write address control field applied to the register file and from each of said addressable registers an operand can be read and applied to an arithmetic and logic unit (ALU) in response to a read address control field being applied to the register file; the ALU executing arithmetic and logic functions on operands applied to the ALU from addressed registers of the register file to produce a result operand, and said result operand being written into a result register in response to a function control field (Func.) being applied to the ALU; the register file and the ALU being active elements of the unit; staging register means for transmitting control fields applied to the staging register means to the active elements of the unit and for applying said control fields to an active element of the unit when required to execute a basic instruction; and a clock distribution circuit which produces and distributes a two phase clock signal, with each phase of a clock signal defining a time slot (TS), the execution of a basic instruction consisting of "n" control fields where "n" is a positive integer greater than two and requires "p" time slots, TS, where "p" is integer greater than one; comprising said CPU executing the steps of:

1. obtaining at least one of said "n" control fields from one of said potential sources of a control field; and
2. transmitting the control field obtained in step 1 through staging register means and applying said control field to an active element of the unit during a time slots when required to execute said instruction.

2. The method of claim 1 in which the potential source of one of said "n" control fields is the MSCW written into the MSCW register.

3. The method of claim 2 in which the potential source of a second of the "n" control fields is the instruction written into the instruction register which is decoded to produce the function control field, Func., and transmitting Func. through staging register means to apply Func. to the ALU when needed to execute said instruction.

4. The method of claim 2 in which "n" equals four and "p" equals four; namely, TS 0, TS 1, TS 2, and TS 3, and in which the control field obtained from the MSCW written into the MSCW register is a write register address control field, WtC, which is read out of the MSCW register and is written into a first staging register during TS 1, is read out of the first staging register and written into a second staging register during TS 2, and read out of the second staging register and applied to the register file during TS 3.

5. The method of claim 3 in which "n" equals four and "p" equals four; namely, TS 0, TS 1, TS 2, and TS 3; and in which Func. is staged through two staging registers prior to Func. being applied to the ALU during TS 2.

6. The method of claim 4 in which a second required control field, Func., is obtained from the MSCW which is written into the MSCW register during TS 0; is read out of the MSCW register and is written into a staging register during TS 1, and is read out of the staging register and transmitted to the ALU during TS 2.

7. The method of claim 6 in which two of said control fields, read address A control field, RdA, and read address B control field, RdB, are in the BOPSCW read out of the BROM and written into the BOPSCW register during TS 1; and RdA and RdB are read out of the BOPSCW register and applied to the register file during TS 2.

8. The method of claim 5 in which two of said "n" control fields, read address A control field, RdA, and read address B control field, RdB, are included in the BOPSCW read out of the BROM and written into the BOPSCW register during TS 1; and RdA and RdB are read out of the BOPSCW register and applied to the register file during TS 2.

9. A microprogrammed central processing unit (CPU) comprising:

an instruction register into which an instruction including an operation (op.) code control field is written;

a main read only control store (MROM) in which are stored micro sequencer control words (MSCW)s at addressable locations, each MSCW including a plurality of control fields;

a MSCW register into which an MSCW read out of the MROM is written;

a basic operations read only control store (BROM) in which are stored basic operations control words (BOPSCW)s at addressable locations, each BOPSCW including a plurality of control fields;

a BOPSCW register into which a BOPSCW read out of the BROM is written, a register file including a plurality of addressable registers with each of the addressable registers having an address and into each of which an operand can be written and from each of which an operand can be read;

an arithmetic and logic unit (ALU) for executing arithmetic and logic functions on operands applied to the ALU from the register file to produce a result operand C, a result register into which the result operand C is written;

a clock distribution circuit which produces timing pulses, with each sequence of four timing pulses defining time slots TS 0, TS 1, TS 2, and TS 3;

the register file in response to a read address A control field (RdA) being applied to the register file reading out the operand written into the addressable register identified by RdA and applying that operand to the ALU as its A input operand, in response a read address B control field (RdB) being applied to the register file reading out the operand written into the addressed register identified by RdB an applying that operand to the ALU as its B input operand, and in response to a write address C control field (WtC) being applied to the register file writing the C operand applied to addressable file into the addressable register identified by WtC;

the ALU in response to a functional control field (Func.) being applied to the ALU performing a logic or arithmetic function specified by Func. on A and B operands applied to the ALU by the register file;

a BOPSCW written into the BOPSCW register, a MSCW written into the MSCW register, and the instruction written into the instruction register being sources of control fields RdA, RdB, WtC, and Func. required to execute a basic instruction;

circuit means for applying an MROM address field obtained from the instruction written into the instruction register to the MROM, the MROM in response thereto reading the MSCW stored in the addressed location of the MROM out of the addressed location and writing that MSCW into the MSCW register during TS 0, the MSCW in the MSCW register including a BROM address control field of a BOPSCW stored in the BROM;

circuit means for applying the BROM address control field of the BOPSCW stored in the BOPSCW register to the BROM, the BROM reading out the BOPSCW stored in the addressed location of the BROM and writing it into the BOPSCW register during TS 1, the BOPSCW written into BOPSCW including RdA, and RdB;

circuit means for obtaining Func. from a source of control fields other than the BOPSCW in the BOPSCW register and applying Func. to the ALU causing the ALU to produce operand C and applying operand C to the result register into which it is written during TS 2;

circuit means for obtaining WtC from a source of control fields other than the BOPSCW in the BOPSCW register and applying WtC to the register file and reading operand C out of the result register and writing the operand C into the addressable register of the register file identified by WtC during TS 3.

10. The microprogrammed central processing as set forth in claim 9, in which the source of the control field Func. is a control field of the MSCW written into the MSCW register which is read out of the MSCW register during TS 1.

11. The microprogrammed central processing unit as set forth in claim 9, in which the source of the control field Func. is the op. code control field of the instruction written into the instruction register and which is read out of the instruction register during TS 0.

12. In a pipelined microprogrammed central processing unit of a data processing system having an instruction register for holding an instruction to be executed with each instruction requiring four time slots; namely, TS 0, TS 1, TS 2, and TS 3, to complete, said instruction including at least one field, a register file having a plurality of addressable registers into each of which an operand can be written and from which an operand can be read, an ALU for performing arithmetic and logic functions on operands written into the addressable registers of the register file, and a result register; the improvements comprising:

an MROM for storing micro-sequencer control words (MSCW)s, each of the MSCWs containing a plurality of fields;

a MSCW register for storing a MSCW control word read out of the MROM;

a BROM for storing BOPS control words (BOPSCW)s at addressable locations;

a BOPS register for storing a BOPSCW read out of the BROM;

clock distribution circuit means for producing a two phase clock signal, with each phase of the clock signal defining a time slot (TS);

first circuit means interconnecting the instruction register to the MROM;

second circuit means connecting the MROM to the MSCW register;

third circuit means connecting the MSCW register to the BROM, and fourth circuit means connecting the BROM to the BOPS register:

the first circuit means applying address signals derived from a control field of the instruction stored in the instruction register to the MROM during time slot 0, said MROM in response to the receipt of said address signals reading out the MROM control word stored at that address, the second circuit means transmitting said MROM control word to the MSCW register for storage therein during time slot 0;

the third circuit means applying address signals derived from a field of the MSCW in the MSCW register to the BROM during time slot 1, said BROM in response to the receipt of said address signals reading out the BOPSCW stored at that address in the BROM, the fourth circuit means transmitting said BOPSCW to the BOPSCW register for storage therein during time slot 1;

circuit means for applying a first field of the MSCW stored in the MSCW register containing an address of an addressable register of the register file into which an operand is to be written to a first staging register during time slot 1, and circuit means for applying a second field of the MSCW stored in the MSCW register identifying the function to be formed by the ALU to a second staging register during time slot 1;

circuit means for applying a first control field of the BOP control word stored in the BOPSCW register to the register file, and circuit means for applying a second control field of the BOP control word stored in the BOPSCW register to the register file during time slot 2, the first and second fields of the BOP control word stored in the BOPSCW register being the addresses of two of the registers in the register file;

circuit means for transmitting the address field written into first staging register to a third staging register, and circuit means for transmitting the function field written into the second staging register to the ALU during time slot 2;

the register file in response to said first and second control fields being applied to it during time slot 2 reading out the operands stored in the addressed registers, circuit means for applying the operands read out of the addressed register to the ALU, the ALU in response to receiving the function control field transmitted to it during time slot 2 executing the arithmetic or logic operation on the operands applied to the ALU by the register file specified by the function control field to produce a result operand, and circuit means for applying the result operand to the result register for storage therein during time slot 2;

circuit means for applying the address field written into the third staging register to the register file, said field identifying the register of the register file into which the result operand is to be written, and circuit means for transmitting the result operand written into the result register to the register file for storage in the addressed register identified by said address field applied to the register file during time slot 3.

\* \* \* \* \*